(12) United States Patent
Unger et al.

(10) Patent No.: US 9,770,959 B2
(45) Date of Patent: Sep. 26, 2017

(54) METHOD FOR PROACTIVE CONTROLLING OF CHASSIS COMPONENTS

(71) Applicant: AUDI AG, Ingolstadt (DE)

(72) Inventors: Andreas Unger, Gaimersheim (DE); Christoph Göhrle, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 15/315,980

(22) PCT Filed: May 29, 2015

(86) PCT No.: PCT/EP2015/001095
§ 371 (c)(1),
(2) Date: Dec. 2, 2016

(87) PCT Pub. No.: WO2015/185198
PCT Pub. Date: Dec. 10, 2015

(65) Prior Publication Data
US 2017/0096042 A1    Apr. 6, 2017

(30) Foreign Application Priority Data
Jun. 7, 2014   (DE) ......................... 10 2014 008 425

(51) Int. Cl.
*B60G 17/0165*    (2006.01)
*B62K 25/24*    (2006.01)
(Continued)

(52) U.S. Cl.
CPC ....... *B60G 17/0165* (2013.01); *B60G 17/018* (2013.01); *B60G 2400/0511* (2013.01);
(Continued)

(58) Field of Classification Search
CPC .... B60G 17/0165; B62K 25/24; G08G 1/162; G08G 1/164; G01C 21/00; G01C 21/005; A01D 75/187; G01S 3/74
See application file for complete search history.

(56) References Cited

U.S. PATENT DOCUMENTS 5,231,583 A * 7/1993 Lizell .................. B60G 17/015
  280/5.506
5,991,460 A * 11/1999 Mitchell ............. G01C 21/005
  359/23
(Continued)

FOREIGN PATENT DOCUMENTS

DE    10 2004 018 088    2/2005
DE    10 2009 009 063    10/2009
(Continued)

OTHER PUBLICATIONS

International Search Report issued by the European Patent Office in International Application PCT/ep2015/001095.

*Primary Examiner* — Yuri Kan
(74) *Attorney, Agent, or Firm* — Henry M. Feiereisen LLC

(57) ABSTRACT

In a method for controlling at least one component of a chassis of a vehicle, a parameterization of a reactive controller of the at least one component of the chassis is changed depending on a current certainty of sensor data of a roadway section to be driven detected by a sensor system, such that, when driving on the roadway section, in the case of increased uncertainty of the sensor data, the reactive controller controls with a lower reaction time with respect to a normal operation.

6 Claims, 2 Drawing Sheets

(51) Int. Cl.
  *B60G 17/015* (2006.01)
  *G01S 3/74* (2006.01)
  *B60G 17/018* (2006.01)

(52) U.S. Cl.
  CPC .. *B60G 2400/0513* (2013.01); *B60G 2400/10* (2013.01); *B60G 2400/821* (2013.01); *B60G 2401/16* (2013.01); *B60G 2500/20* (2013.01)

(56) References Cited

U.S. PATENT DOCUMENTS

| | | | |
|---|---|---|---|
| 8,762,000 | B2 | 6/2014 | Schindler et al. |
| 9,397,534 | B2 | 7/2016 | Koch et al. |
| 2002/0105423 | A1* | 8/2002 | Rast ............ G08G 1/162 340/479 |
| 2006/0277882 | A1* | 12/2006 | Berger ......... A01D 75/187 56/10.2 J |
| 2010/0098295 | A1 | 4/2010 | Zhang et al. |
| 2011/0245995 | A1 | 10/2011 | Schwarz |
| 2012/0293358 | A1* | 11/2012 | Itoh ............ G01S 3/74 342/107 |
| 2013/0238164 | A1 | 9/2013 | Matsuda |
| 2014/0316652 | A1* | 10/2014 | Ericksen ....... F16F 9/512 701/37 |
| 2014/0358412 | A1* | 12/2014 | Fausten ........ G08G 1/164 701/117 |
| 2015/0254803 | A1 | 9/2015 | Schindler et al. |
| 2016/0052591 | A1* | 2/2016 | Michael ........ B62K 25/24 280/5.507 |

FOREIGN PATENT DOCUMENTS

| | | | |
|---|---|---|---|
| DE | 10 2009 033 219 | | 7/2010 |
| DE | 10 2010 035 235 | | 4/2011 |
| DE | 10 2011 085 287 | | 5/2013 |
| DE | 10 2012 010 553 | | 12/2013 |
| EP | 1 138 530 | | 10/2001 |
| EP | 2 382 118 | | 3/2013 |
| JP | 2007178271 A | * | 7/2007 ...... G01C 21/00 |
| JP | 2007178271 A | * | 7/2007 |
| WO | WO2014/195180 | | 12/2014 |

\* cited by examiner

METHOD FOR PROACTIVE CONTROLLING OF CHASSIS COMPONENTS

CROSS-REFERENCES TO RELATED APPLICATIONS

This application is the U.S. National Stage of International Application No. PCT/EP2015/001095, filed May 29, 2015, which designated the United States and has been published as International Publication No WO 2015/185198 and which claims the priority of German Patent Application, Serial No. 10 2014 008 425.6, filed Jun. 7, 2014, pursuant to 35 U.S.C. 119(a)-(d).

BACKGROUND OF THE INVENTION

The present invention relates to a method for controlling a component of a chassis of a vehicle and a correspondingly configured control device.

Vehicles with active or proactive chasses, which automatically adjust to actual road conditions, usually include a so-called "reactive" controller and a so-called "proactive" path. By means of the reactive controller unevenesses or road conditions can be compensated after a respective vehicle has driven on a section of the road or course. A proactive control method on the other hand is based on a forward-looking approach, for example by using sensors in order to provide a setpoint variable for setting or controlling the chassis of the respective vehicle directly upon a first contact with an unevenness or a potentially relevant road section and to proactively precisely adjust the vehicle to the road section to be driven on.

Reactive controllers and proactive control methods both have advantages and disadvantages. For example in a proactive control method an actuator position of a component of a chassis of a vehicle can be exactly adjusted to the shape of the bump as determined anticipatorily, when driving over the bump, so that the anticipatorily determined bump is completely compensated and the vehicle is optimally adapted to the bump or the corresponding road section. However, because a data set composed of sensor data determined by anticipatory sensors is usually subject to errors the shape and position of possible unevenesses such as the mentioned bump may deviate from an actual shape or position of the corresponding unevenness. As a result of setting or controlling for example an actuator of a vehicle chassis according to the determined data set, the chassis may be set erroneously, for example due to measuring errors in the data set, and may react inappropriately to the actual unevenness. As a result of such an erroneous setting of components the vehicle may become destabilized and find itself in a dangerous situation.

With regard to the reactive control by means of the reactive controller, a chassis of a vehicle can be set with a fast-operating reactive controller so that a plurality of unevenesses is compensated, wherein a complete, i.e., hundred-percent, adaption to respective unevenesses can usually not be achieved. Reactive controllers further adversely affect a driving behavior of a respective vehicle when the controllers are set too fast, i.e., when they are set with an excessive bandwidth or amplification, so that usually a sluggish setting or parameterization of settings is selected, and as a consequence unevenesses cannot be completely compensated.

The European patent document EP 2 382 118 B1 describes a method and a device for determining a road profile in front of a vehicle by way of detected image data and/or data regarding the vehicle's own movement, wherein an estimation device is provided in dependence of which at least one chassis function of a vehicle is controlled and/or regulated.

The German laid open document DE 10 2012 010 553 A1 discloses a method for controlling an active chassis of a vehicle in which control signals for actuators of the chassis are generated by using data of a height profile in front of a vehicle detected by a sensor arranged on the vehicle and by using setpoint values of a movement of a chassis of the vehicle.

SUMMARY OF THE INVENTION

In light of the foregoing a method for controlling at least one component of a chassis of a vehicle is described in which in dependence on an actual certainty of sensor data of a road condition of a road section to be driven on detected by sensors, a parameterization of a reactive controller of the at least one component of the chassis is changed so that the reactive controller, upon driving on the road section, takes the sensor data into account with a bandwidth that is increased relative to a normal operation of the reactive controller so that in dependence on the actual certainty of the sensor data the controller controls with a shorter reaction time compared to the normal operation.

Embodiments are set forth in the dependent claims and the description.

The method according to the invention provides that a reactive controller is parameterized or switched when sensor data exist that indicate that for example an unevenness lies ahead on a road to be driven on and an uncertainty of the underlying sensor data is high, i.e., above a threshold value. As a result of the switching or new parameterization of the reactive controller the reactive controller is controlled with a bandwidth and amplification that is high compared to a normal operation of the controller so that the reactive controller acts fast on the respective chassis components, i.e., with a reaction time that is reduced compared to the normal operation, and the respective chassis components such as shock absorbers adapt correspondingly fast to the respective road section when driving over the road section.

The term parameterization in the context of the present invention means a process in which a device such as a reactive controller is parameterized, i.e., it is set so that the device adapts its properties such as bandwidth and amplification of respective sensor data to parameters, i.e., operating parameters, changed by the parameterization.

The term road condition in the context of the present invention describes properties of the road such as unevenesses, slippery road conditions or a road type, such as gravel road, paved road or grass road, wherein also any other feature of a property of a road can be used to describe a road condition.

The term road in the context of the present invention means a surface to be driven on, in particular a street or a path; a road section thus corresponds to a part of the road, which is for example detected by a sensor and can be defined or described in a dataset via corresponding sensor data.

The term high bandwidth in the context of the present invention means a bandwidth, which is increased compared to a normal operation, in particular by 50%, 100% or 1000%.

The term amplification in the context of the present invention describes a transformation of a signal such as a level, for example by using an offset or a multiplier, wherein the transformation can increase or decrease original sensor data.

The term bandwidth in the context of the present invention describes a range, for example of a frequency window with fixed corner frequency of a filter for respective sensor data, in which a regulation occurs and outside of which no regulation occurs. This means that the reactive controller filters sensor data of a sensor, such as a height sensor, a superstructure acceleration sensor, a pitch sensor or a roll sensor and regulates, i.e., generates control commands, only based on a part or spectrum of the sensor data within respective corner frequencies.

In order to transition into a normal operation again with a sluggish, i.e., slower or normal reaction time compared to the operation in the case of uncertain sensor data of the reactive controller, after an unevenness or a relevant road section, it is provided that the reactive controller is controlled or operated with a high bandwidth and amplification only so long as the sensor data are subject to a high uncertainty or for the time that a respective relevant road section is expected to last according to the sensor data.

It is also provided that for the case that certain, i.e., reliable sensor data are present, the measured road unevennesses are computed into actuating signals for example by a control device, directly after having been detected by a respective sensor, for adjusting the chassis after detection by a respective sensor, so that the unevenness is no longer adjusted reactively but proactively, i.e., in a forward-looking manner prior to a first contact with a potentially occurring obstacle. It is provided that the reactive controller is not active in case of a proactive control.

The term sensor data in the context of the present invention means all data or datasets which are detected for example by a camera, and serve for describing a road section and for adjusting respective chassis components.

In order to detect or determine sensor data over a respective road section or a road condition it is provided that the respective vehicle has at least one sensor, which is used anticipatorily, i.e., which measures or analyzes a respective road section to be driven on and provides corresponding sensor data of a road section to be driven on, for example to a control device, so that by way of the sensor data provided by the at least one sensor respective chassis components of the respective vehicle can be controlled.

In order to evaluate a certainty, i.e., validity or reliability of respective sensor data an embodiment provides that for example a certainty index in the form of a numerical value is provided so that by way of the certainty index it can be evaluated whether an accelerated reactive control or a normal operation, for example a with proactive control, is required.

Another embodiment provides that the certainty index is for example calculated in dependence on potential measuring errors, data variances or additional information. The certainty index can be calculated by a control device of the respective vehicle or can be provided externally for example by an information service.

In a further possible embodiment of the method according to the invention it is provided that the senor data are combined with GPS-data into a dataset and are transmitted to a server, which provides further vehicles with corresponding datasets of road sections that are potentially relevant for a reactive control.

In order to enable different vehicles for example of a vehicle fleet to exchange information with each other, i.e., for example to make sensor data or other information sources of individual vehicles available to multiple vehicles, it is provided that respective information of respective vehicles is gathered and administered centrally by a server. Hereby the respective sensor data of respective vehicles are linked by the server with GPS data, i.e., Global Positioning System data, or are assigned to respective GPS data of a respective vehicle. The sever is further configured to forward, i.e., wirelessly transmit, thusly processed sensor data to at least a subset of the vehicles that are in communication with the server. Based on the data provided by the server respective vehicles can evaluate, for example via a control device, a certainty or reliability of sensor data provided by own sensors, and may calculate settings for controlling respective chassis components or controllers early, for example before sensor data regarding a potentially relevant road section are available, and correspondingly regulate or control the respective chassis components fast and precisely.

In a further possible embodiment of the method according to the invention it is provided that, in dependence on an actual situation of the vehicle and/or an actual situation of a respective environment, the relative controller at least partially controls with a bandwidth and amplification that is increased compared to a normal operation, wherein the reactive controller is set with a base value in dependence on sensor data over the road section.

In order to take into account a situation in a respective environment such as weather influences, curve drives, road contaminations or the like and situations of the vehicle, i.e., an actual technical state, it is provided that in dependence on an actual situation of the environment and/or the vehicle the reactive controller is parameterized so that the reactive controller controls with an increased bandwidth and amplification in potentially dangerous situations, i.e., situations in which a data state regarding a condition of the environment or the vehicle is potentially unclear or uncertain, and a proactive control is performed in a situation in which a normal operation is possible or reliable sensor data are available.

In a further possible embodiment of the method according to the invention it is provided hat the reactive controller controls either in dependence on a changed parameterization or in dependence in a set base value depending on a reliability of the sensor data.

In a further possible embodiment of the method according to the invention it is provided that the at least one component of the chassis of the vehicle is selected from the following list of chassis components: actuators, shock absorbers, spring travel limiters, pressure regulators, brake systems or control devices.

Because chasses of vehicles become increasingly complex and the number of chassis components steadily increases it is provided that the method according to the invention can be used for controlling all, a part or individual chassis components of a vehicle.

The method according to the invention can be used for any arrangement of vehicles with active or semi-active chassis components such as active chasses or semi-active chasses and also individual actuators.

It is conceivable that a respective vehicle includes an active chassis, which is based on a parallel arrangement of spring, shock absorber and actuators or any possible combination of actuator and spring or shock absorber, wherein also an exclusive use of individual actuators is conceivable. In the case of a semi-active chassis it is provided that reactive controllers of adjustable components such as shock absorber, are influenced in a forward looking manner in dependence of respective sensor data, however are for example not actively lifted as is the case in a proactive control.

Furthermore when a spring and an actuator are arranged in series the actuator can be used for a so-called spring mount adjustment in order to prepare the respective vehicle for unevenesses.

The present invention also relates to a control device for arrangement in a vehicle, which is configured to parameterize at least one reactive controller so that in dependence on a certainty of sensor data determined by sensors of the vehicle regarding a road condition of a road section to be driven on, the reactive controller can take the sensor data into account with an increased bandwidth and amplification relative to a normal operation of the reactive controller, when the sensor data are subject to a high uncertainty.

The control device according to the invention serves in particular for implementing the method according to the invention.

In order to read out and evaluate data, for example of a sensor, and to calculate corresponding certainty indexes, and to control respective chassis components, it is provided that the method according to the invention is performed on a control device in a vehicle, wherein the control device can be in wireless communication with an external data service via an interface, which external data service is for example performed using a server.

Further advantages and embodiments of the invention will become apparent from the description and the included drawing.

It is understood that the features mentioned above and to be discussed below may not only be used in the respectively described combination but also in other combinations or individually without departing form the scope of the present invention.

BRIEF DESCRIPTION OF THE DRAWING

The invention is schematically illustrated by way of embodiments shown in the drawings and is described schematically and in detail with reference to the drawings.

DETAILED DESCRIPTION OF PREFERRED EMBODIMENTS

Figure 1:
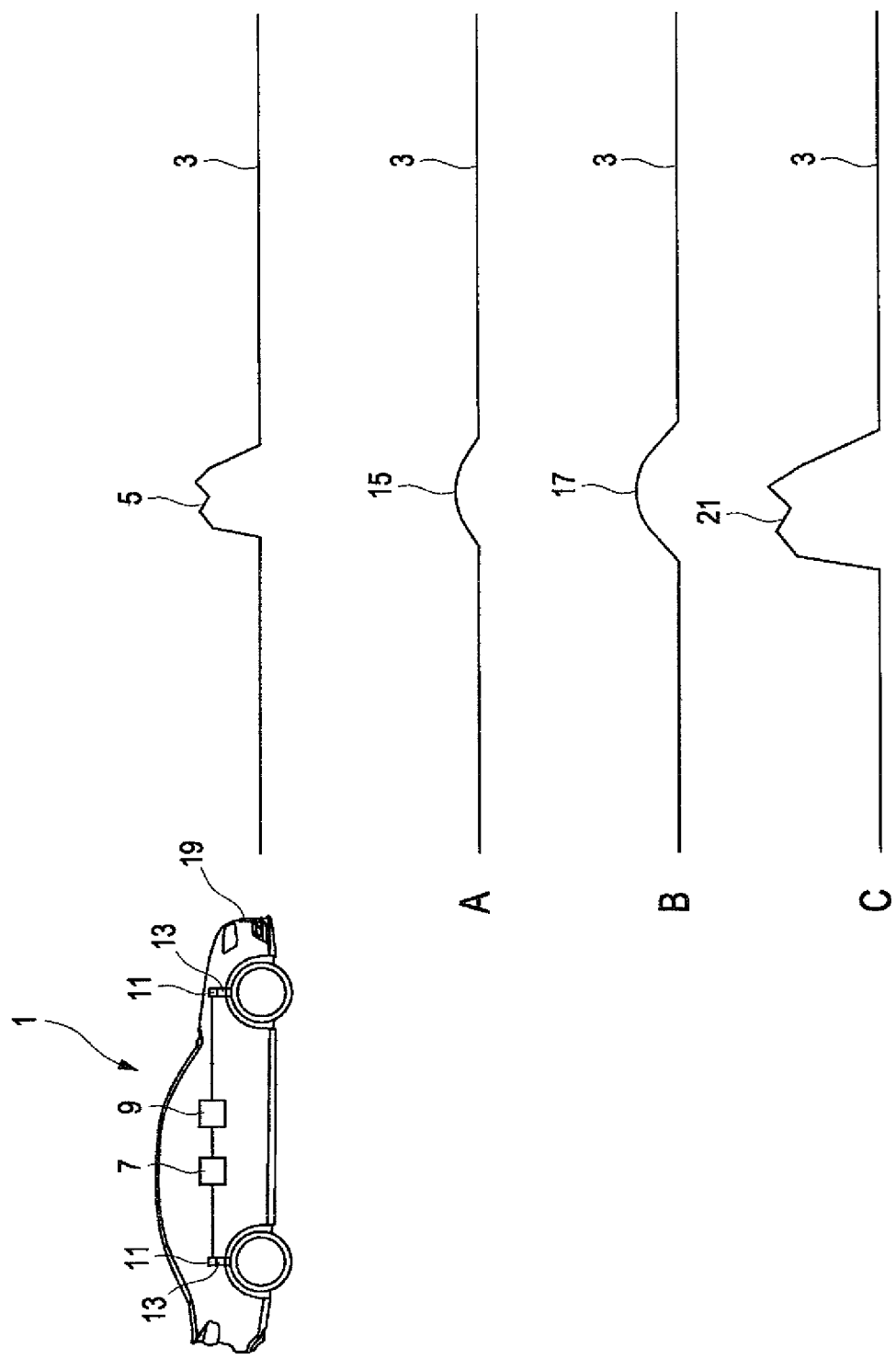
FIG. 1 shows a schematic overview of different control cases for an embodiment of the method according to the invention.

In FIG. 1 a vehicle 1 drives on a road 3, on which an unevenness 5 is located. The vehicle 1 includes a control device 7 and a reactive controller 9 which are both in communication with actuators 11 of active chassis components 13 of a chassis of the vehicle 1 in order to regulate i.e., control the same.

For adjusting the active chassis components 13 to the unevenness 5 different scenarios of control settings A, B, and C are shown. In scenario A a control of the actuators 11 and as a result the active chassis components 13, is performed by the reactive controller 9, which is in a normal operating mode and controls the actuators 11 sluggish, i.e., with a small bandwidth and amplification. Due to the small bandwidth and amplification the actuators 1 are adjusted to the unevenness 5 insufficiently because only at the point when the vehicle drives onto the unevenness 5 a control requirement is detected so that due to the sluggish setting the reactive controller 9 only reacts slowly to the unevenness 5. This means that the vehicle 1 is insufficiently prepared for the unevenness 5 and reacts to a form of the unevenness 5 which corresponds to an elevation 15 which was for example measured at the beginning when driving onto the unevenness 5 and due to the sluggish reactive controller 9 occurs here only delayed with a comparative low and thus here insufficient amplitude.

In contrast to scenario A scenario B shows a control by a fast-parameterized or controlling reactive controller 9. As a result of a comparatively great bandwidth and amplitude the reactive controller 9 can react to small changes of the road 3 and correspondingly adjust the actuators 1. This means that while the vehicle 1 drives over the unevenness 5 respective switching signals are transmitted fast, i.e. accelerated compared to a normal operation and with a comparatively high amplitude, to the actuators 11 by the reactive controller 9 so that the actuators 11 adjust or are adjusted to an elevation 17 which substantially corresponds to the unevenness 5.

In scenario C a proactive control is shown in which in dependence on information based on a sensor 19 which measures the road 3, control commands are generated by the control device 7 which prepare the actuators 11 of the vehicle 1 for an imminent drive over the obstacle 5 prior to the vehicle 1 coming into contact with the obstacle 5. Due to measuring errors of the sensor 19 a virtual image 21 of the obstacle 5 however is inaccurate, i.e., in this case too large compared to the obstacle 5, so that the control commands of the actuators 11 calculated by the control device 7 do not fit the obstacle 5 and the vehicle 1 is controlled in an unfavorable manner when driving over the obstacle 5.

According to the invention it is provide that in dependence on a certainty or reliability of the information of the sensor 19 it is switched between the control methods described in the scenarios A, B and C.

Figure 2:
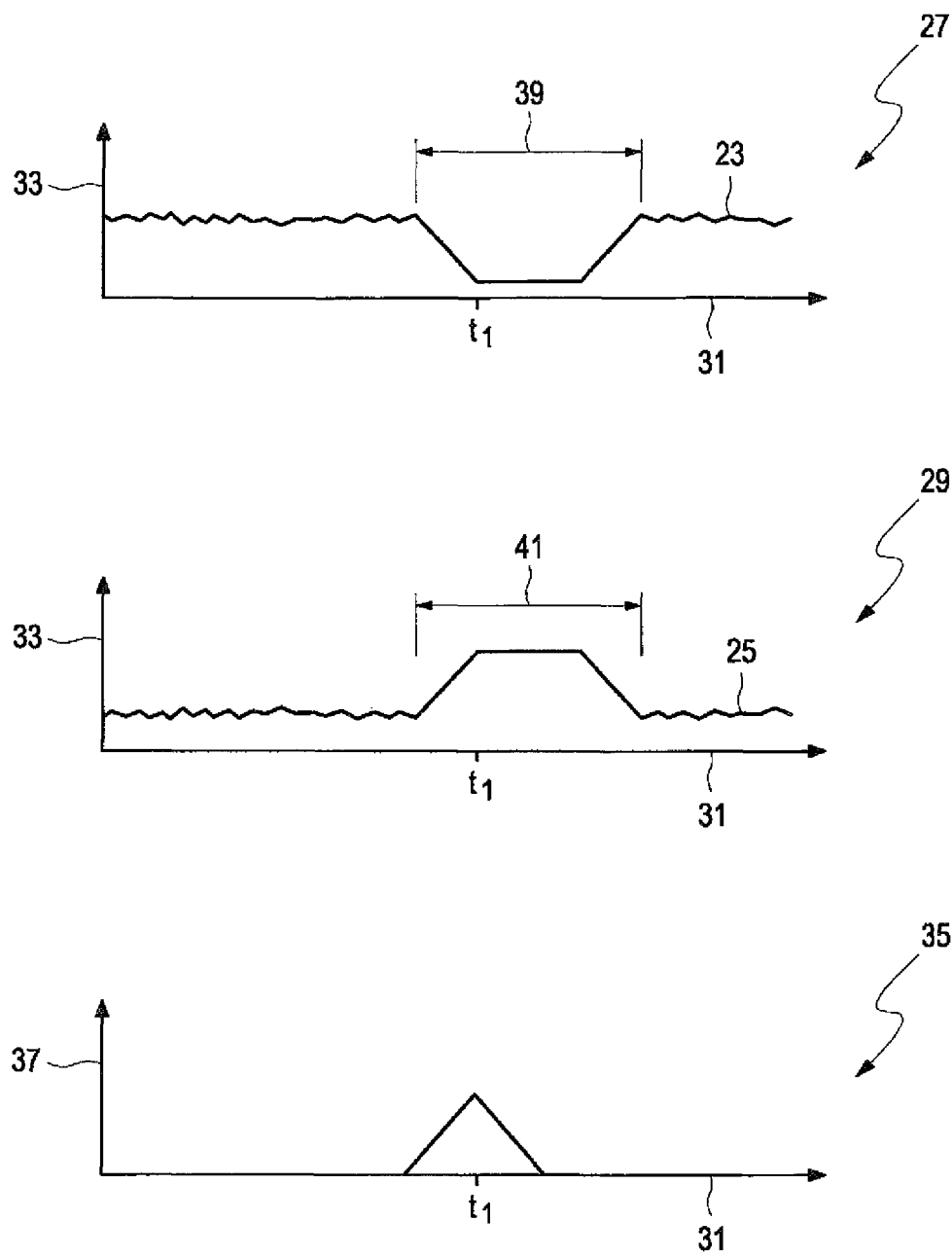
FIG. 2 shows a schematic overview of different courses of a certainty index which result in different control cases of a further embodiment of the method according to the invention.

FIG. 2 shows two different courses 23 and 25 of a certainty index in diagrams 27 and 29 which are plotted over axes "time" 31 and "certainty" 33. In diagram 35, which is plotted over the axes "time" 31 and "height" 37 a course of measurement values of sensor 19 is shown.

The certainty index is calculated by a variance of the measurement values determined by the sensor 19 and reflects a confidence of the measured data. At a time point t1 the unevenness 5 shown in FIG. 1 occurs and is recognized by the sensor 19 of he vehicle 1.

For the case of a low certainty or low values of the certainty index shown in diagram 27, as shown by a region 39 of the course 23, the invention provides that a control is conducted by the reactive controller in order to avoid a faulty setting by a proactive control based on measuring data of the sensor 19, i.e. sensor data that are subject to an excessive uncertainty or insufficient certainty. The course 25 shown in diagram 29 with a high certainty index in a region 41 results in a reactive control by the control device 7 of the vehicle 1 because in this case it can be assumed that the virtual rendition of the unevenness 5 by the sensor 19 or by the measurement values determined by the sensor 19 is appropriate so that a faulty setting of the vehicle 1 or respective chassis components is unlikely.

What is claimed is:

1. A method for controlling at least one component of a chassis of a vehicle, comprising:
   with a sensor determining sensor data of a road section to be driven on by the vehicle;

calculating a certainty index of the sensor data as a function of a variance of the sensor data;

calculating an actual certainty of the sensor data as a function of the certainty index; and changing a parameterization of a reactive controller of the at least one component of the chassis as a function of the actual certainty of the sensor data so that when the vehicle drives on the road section the reactive controller controls the at least one component with a reaction time that is shorter compared to a normal operation of the reactive controller, when the sensor data have an increased actual uncertainty, wherein the reactive controller controls the at least one chassis component as a function of at least one of an actual situation of the vehicle and an actual situation of a respective environment present during a drive of the vehicle on the road section at least temporarily by using a bandwidth and amplification which is increased at least 50% compared to the normal operation of the reactive controller, wherein the reactive controller is set to a base value in dependence on the sensor data.

2. The method of claim 1, further comprising controlling the chassis proactively when the certainty index indicates that the sensor data are certain.

3. The method of claim 1, wherein the sensor data are detected via at least one sensor selected from a group consisting of spring travel sensor, superstructure acceleration sensor, roll sensor and yaw sensor.

4. The method of claim 1, further comprising linking the sensor data with GPS-data to form a dataset and transmitting the dataset to a server which provides further vehicles with corresponding data sets of potentially relevant road sections.

5. The method of claim 1, wherein the at least one component of the chassis of the vehicle is selected from a group consisting of actuators, shock absorbers, spring travel limiters, pressure controllers, brake systems, electric motors, hydraulic cylinders and control devices.

6. A control device for arrangement in a vehicle, said control device parameterizes at least one reactive controller in dependence on a certainty of sensor data of a road section to be driven on detected by a sensor of the vehicle so that the at least reactive controller controls with a reaction time that is decreased compared to a normal operation of the reactive controller when the sensor data have a high uncertainty, wherein the uncertainty or certainty of the sensor data is calculable via a certainty index, and wherein the certainty index is calculable via a variance of the sensor data, wherein the reactive controller controls the at least one chassis component as a function of at least one of an actual situation of the vehicle and an actual situation of a respective environment present during a drive of the vehicle on the road section at least temporarily by using a bandwidth and amplification which is increased at least 50% compared to the normal operation of the reactive controller, wherein the reactive controller is set to a base value in dependence on the sensor data.

* * * * *